Patented Aug. 11, 1953

2,648,676

UNITED STATES PATENT OFFICE 2,648,676

VAT DYE AND INTERMEDIATE

Wilhelm Schmidt-Nickels, Little York, N. J., assignor to General Aniline & Film Corporation, New York, N. Y., a corporation of Delaware No Drawing. Application March 19, 1951, Serial No. 216,457

2 Claims. (Cl. 260—329.2)

This invention relates to new and valuable vat dyestuffs containing a benzanthrone nucleus and intermediates therefor and particularly to dyestuffs containing a benzanthrone nucleus reacted with a thionaphthene to form a fast bright orange dye.

In the prior art dyestuffs have been prepared by reacting benzanthrone $Bz_1$-carboxylic acid chloride with other compounds. None of these dyestuffs, however, are known to be similar in structure or properties to that which I have discovered.

The dyestuffs of my invention are obtained by reacting benzanthrone-$Bz_1$-carboxylic acid chloride with thionaphthene followed by a ring closure. The dyestuffs have the following general formula:

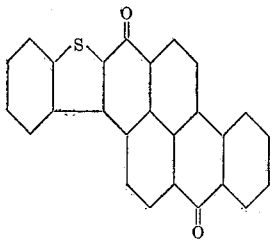

said compounds being unsubstituted or alkyl (methyl, ethyl, propyl) substituted or, by further substitution, containing one or more nuclear substituents of the class consisting of halogen (chlorine, bromine), alkoxy (methoxy, ethoxy), and acylamino (benzoylamino) groups.

The dyestuffs of this invention are prepared by reacting equal molar proportions of thionaphthene and benzanthrone $Bz_1$-carboxylic acid chloride in the presence of anhydrous aluminum chloride in a solvent such as nitrobenzene. The resultant compound is then ring-closed by aluminum chloride-sodium chloride fusion in presence of oxygen. The first reaction is carried out at a temperature in the range 60 to 100° C. and preferably in the range 70 to 80° C. The fusion may be accomplished at a temperature of about 130–190 and preferably 150–170° C. The time of the first reaction is several hours while the aluminum chloride-sodium chloride-oxygen treatment takes only about 45 minutes. The dyestuffs obtained dye cotton and other cellulose fibers a bright orange in the usual vat dye process to shades having excellent fastness to chlorine bleach.

A preferred method of preparing the dyestuffs of my invention is illustrated by the following example, wherein parts are by weight, but it will be understood that the invention is not limited thereto and that variations and substitutions may be made within the scope of the appended claims.

Example

A charge of 108 parts nitrobenzene, 5.9 parts benzanthrone-$Bz_1$-carboxylic acid chloride, 24 parts anhydrous aluminum chloride, 2.7 parts thionaphthene is stirred at 75–80° C. for 3 hours. The reaction product is poured into a little water containing 12 parts hydrochloric acid concentrated (35%). The nitrobenzene is then removed by steam distillation. The solid reaction product is filtered and for removal of possibly present benzanthrone-$Bz_1$-carboxylic acid extracted at 70° C. with a mixture of 54 parts concentrated ammonia (28%) and 300 parts water. After filtration and washing to neutrality the product weighed 7.0 parts by weight.

The cyclization of the obtained ketone is carried out as follows:

A charge of 107 parts anhydrous aluminum chloride, and 23 parts sodium chloride is heated to 160° C. at which temperature there is added to the liquid melt under agitation 7 parts of the ketone. A fast stream of dry oxygen is blown through the melt under agitation at 160° C. for 45 minutes. The reaction product is poured into 500 parts water and 30 parts concentrated hydrochloric acid (35%). After boiling for 10 minutes the dyestuff is filtered, washed neutral and dried. Weight obtained equals 7 parts. A dyestuff past can be made by the known method of dissolving the dyestuff in concentrated sulfuric acid and pouring the solution in water. The product dyes cotton from a hydrosulfite vat a bright orange shade of excellent chlorine fastness. Analysis: Found, S=8.81%; theory for $C_{25}H_{12}O_2S$, S=8.52%.

This reaction may be represented by the following scheme:

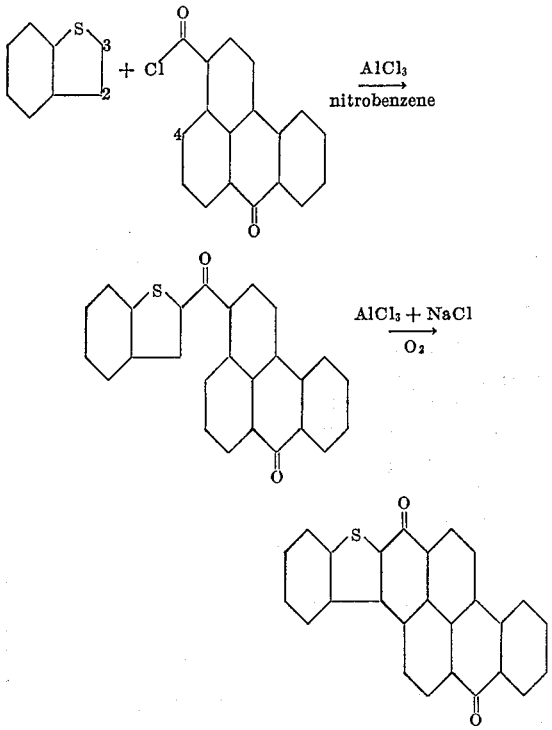

Similar dyestuffs are obtained by employing, instead of thionaphthene and benzanthrone $Bz_1$-carboxylic acid chloride in the foregoing example, equivalent quantities of nuclear substitution products of either one or both of these intermediates containing one or more alkyl groups apiece, for example, by reacting benzanthrone $Bz_1$-carboxylic acid chloride with 5-methylthionaphthene of the formula:

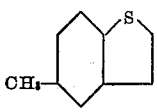

to form:

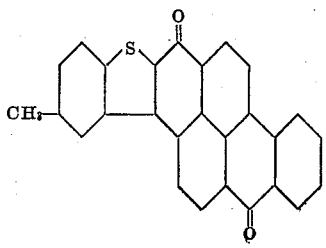

Alternatively, the compound obtained by the example, unsubstituted or containing alkyl substituents may have other substituents introduced by the known procedures such as halogen, alkoxy and acylamino groups. Substituent alkyl groups in the original intermediates, of course, may not be present in position to block the reaction and ring closure (4 in the benzanthrone and 2,3 in the thionaphthene). It will be understood that such groups as halogen groups present in the original intermediates might not withstand the drastic conditions of the reactions and if these substituents are desired, they may be introduced after the dyestuff has been formed by procedures customarily used for introducing such substituents into vat dyestuffs of the benzanthrone series.

If desired, bright orange vat dyestuffs of this invention can be converted into the alkali metal salt of the sulphuric acid ester of the corresponding leuco compound by the usual methods, for example, by reduction of the dyestuffs with a hydrogen liberating metal such as iron or zinc, preferably accompanied by a minor amount of copper, in a mixture of chlorsulfonic acid and pyridine followed by drowning of the reaction mixture in an aqueous alkali metal carbonate solution and salting out of the resulting leuco ester salt after removal of the pyridine by distillation. The resulting leuco sulphuric acid ester salts yield shades having color and fastness properties similar to those obtained by vat dyeing processes from the original dyestuffs, upon application by printing or dyeing of the material and development of the color by treatment with an acid oxidizing bath.

This is a continuation in part of my copending application Serial No. 77,440 filed February 19, 1949, now abandoned.

I claim:

1. A vat dyestuff having the following formula:

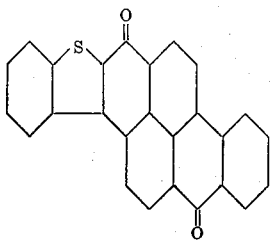

2. A process for preparing a bright orange vat dyestuff of the benzanthrone series which comprises reacting one mole of benzanthrone-$Bz_1$-carboxylic acid chloride with one mole of thionaphthene at an elevated temperature and subsequently ring closing the ketone thus formed.

WILHELM SCHMIDT-NICKELS.

No references cited.